United States Patent
Okamura et al.

(10) Patent No.: US 7,508,564 B2
(45) Date of Patent: Mar. 24, 2009

(54) SCANNING OPTICAL APPARATUS

(75) Inventors: Hideki Okamura, Osaka (JP); Hideki Sugimura, Osaka (JP); Takayuki Kurihara, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 170 days.

(21) Appl. No.: 11/546,143

(22) Filed: Oct. 11, 2006

(65) Prior Publication Data
US 2007/0081074 A1 Apr. 12, 2007

(30) Foreign Application Priority Data
Oct. 12, 2005 (JP) .............................. 2005-298082
Nov. 30, 2005 (JP) .............................. 2005-347076

(51) Int. Cl.
*G02B 26/08* (2006.01)
(52) U.S. Cl. ..................................... 359/205
(58) Field of Classification Search ......... 359/204–208; 347/233, 241, 244
See application file for complete search history.

(56) References Cited

U.S. PATENT DOCUMENTS
6,535,317 B2 * 3/2003 Ishibe ........................ 359/205

FOREIGN PATENT DOCUMENTS
JP 9-080331 3/1997

* cited by examiner

*Primary Examiner*—Euncha P Cherry
(74) *Attorney, Agent, or Firm*—Jordan and Hamburg LLP

(57) ABSTRACT

A scanning optical apparatus capable of keeping sub scanning magnification small, arid further, of keeping the apparatus size small without elongating lenses, also suppresses spherical aberration relative to a scanning surface of a beam light small, thereby illuminating the beam light of high quality on the scanning surface. A beam light from a scanner is magnified by a scanning lens (magnifying lens). This allows sub scanning magnification to be minimized. Also, spherical aberration which is ordinarily aggravated since the beam light is magnified by the scanning lens is suppressed by arranging a correcting lens in the downstream from the scanning lens, as being decentered relative to a light axis of the beam light.

8 Claims, 7 Drawing Sheets

(a)

(b)

(c)

(d)

(a)

(b)

SCANNING OPTICAL APPARATUS

BACKGROUND OF THE INVENTION

1. Field of the Invention

The present invention relates to a scanning optical apparatus for scanning a light outputted from a light source on a prescribed scanning surface.

2. Description of the Related Art

In image forming apparatuses such as printers, copiers, and facsimiles, a scanning optical apparatus, which scans a beam light for writing an electrostatic latent image on an image supporter, is employed for the purpose of writing said electrostatic latent image on said image supporter such as photoreceptor drums.

Such scanning optical apparatus employs a polarizer such as polygon mirrors for converging the beam light into scanning light. The beam light from a light source is converged on the surface of the polarizer, and then, converged again on the image supporter (hereinafter referred to as "photoreceptor drum") by a lens (so called, f. theta. lens). That is, the beam light is coupled in relation to the surface of the polarizer and the photoreceptor drum, thereby correcting an optical face tangle error of the polarizer. Additionally hereinafter, a scanning direction of the beam light by the polarizer is referred to as "main scanning direction", and a direction at right angles to the traveling directions of the main scanning direction and the beam light is referred to as "sub scanning direction".

In recent years, as a lens for converging the beam light on the image supporter, for example, a plurality of lenses (such as, a scanning lens and a correcting lens) are employed, arranged on the light path of a single beam light as illustrated in a patent literature 1 (Unexamined Japanese Patent Publication No. H9-80331).

As indicated in Patent literature 1, the followings are benefited by using a plurality of lenses. That is, when a plurality of lenses is used, controllable parameters generally increase, thereby making it easy for the optical design to be adaptable to various conditions.

For example, spherical aberration can generally be suppressed small, when the beam light fallen on a lens has a narrower spread (in short, the beam light should be fallen on as near the center of the lens as possible). Therefore, when using a plurality of lenses, it becomes possible to employ a method for converging the beam light in a phased manner by such plurality of lenses, and thus, the spherical aberration of when the beam light is converged on the photoreceptor drum is suppressed smaller than that of when the beam light is converged by a single lens. This enables density growth of the beam light on the photoreceptor drum, thereby increasing the writing speed of the electrostatic latent image.

FIG. 1, as illustrated in Patent literature 1, shows a schematic cross-sectional view of a printer B (image forming apparatus) employing a scanning optical apparatus X2 according to a conventional example, in which a plurality of lenses is arranged in between a polarizer and a photoreceptor drum. Hereinafter, as referring to FIG. 1, Scanning optical apparatus X2 in accordance with a conventional example, as well as Printer B using the same are explained.

Printer B shown in FIG. 1 comprises a printing member α1 for forming a toner image and printing it onto printing paper, a paper feeder α2 for feeding the printing paper to Printing member α1, and a paper discharger α3 for discharging the printing paper on which printing has been conducted. Through an external input interface not shown, a prescribed printing request signal indicating a printing request, as well as a image data signal indicating image data are inputted from an external device (typically, a personal computer) connected to Printer B. The image data is read by an image processing controller not shown based on the image data signal, and then transformed into gray value data relative to each of four colors: black (BK), magenta (M), yellow (Y), and cyan (C).

Printing member α1 schematically comprises, such as; photoreceptor drums 1BK, 1M, 1Y, and 1C corresponding to each of said four colors; Scanning optical apparatus X2; developers 7BK, 7M, 7Y, and 7C corresponding to each of the colors; a intermediate transfer belt 8; various types of rollers 9a, 9b, and 9c; and a fixing apparatus 10. Said image processing controller controls four light sources 2 (see FIG. 7, black light source 2BK, magenta light source 2M, yellow light source 2Y, and cyan light source 2C) based on the gray value data for illuminating a light onto each of Photoreceptor drums 1 (black Photoreceptor drum 1BK, magenta Photoreceptor drum 1M, yellow Photoreceptor drum 1Y, and cyan Photoreceptor drum 1C) which correspond to four colors black (BK), magenta (M), yellow (Y), and cyan (C), thereby illuminating a beam.

The beam is guided to the above mentioned each of Photoreceptor drums 1 by Scanning optical apparatus X2 having such as a plurality of deflecting mirrors 3, polarizer 4, and each of lenses 5, 6 as described later in details, thereby forming an electrostatic latent image on the surface of each Photoreceptor drum 1.

Additionally, the toner on developing rollers in Developers 7 (black Developer 7BK, magenta Developer 7M, yellow Developer 7Y, and cyan Developer 7C) corresponding to each of Photoreceptor drums 1 is pulled onto the surface of each of Photoreceptor drums 1, and then, by the toner, an electrostatic latent image is developed as a toner image according to the electric potential gap (developing bias) between each of Photoreceptor drum 1 and each of the developing rollers.

Paper feeder α2 schematically comprises such as a paper cassette 11 and a paper feeding roller 12. Printing paper is previously set in Paper cassette 11. According to a printing request from a user (for instance, an operation input from an operation panel installed in the exterior of Printer B), Paper feeding roller 12 is rotary-driven by the control of the image processing controller, thereby delivering the printing paper in Paper cassette 11 into Printing member α1.

The printing paper from Paper feeder α2 is delivered by a delivering roller 9a. Also, on a registration roller 9b, the printing paper is set in the suspended state for a proper time. This enables adjustment of timing of the printing paper reaching to a nip between Intermediate transfer belt 8 and a secondary transfer roller 9c. On the other hand, the toner image formed on each of the Photoreceptor drums 1 is transferred to Intermediate transfer belt 8, and then, by the drive of the same, transferred onto the printing paper passing through the nip between Intermediate transfer belt 8 and Secondary transfer roller 9c. Then, the printing paper on which the toner image was transferred is delivered to Fixing apparatus 10, and then fixed onto the printing paper by, for example, such as a heat roller. The printing paper on which the toner image was fixed is then delivered to Paper discharger α3 and discharged.

Scanning optical apparatus X2 is for guiding each of the beam lights outputted from a plurality of Light sources 2 for writing an electrostatic latent image to each of corresponding Photoreceptor drums 1, and at the same time, for scanning said beam lights thereon.

FIG. 7 shows a general structure of Scanning optical apparatus X2. Hereinafter, as referring to FIGS. 1 and 7, Scanning optical apparatus X2 in accordance with a conventional example is explained. In addition, as mentioned above, Scanning optical apparatus X2 is applicable to tandem type Printer B, in which totally four light paths for guiding the beam light to each of four Photoreceptor drums 1 (1BK, 1M, 1Y, and 1C) are formed. However, in FIG. 7, one of four light paths is hypothetically shown for simplicity.

Scanning optical apparatus X2 includes; Light sources 2 corresponding to each of the above-mentioned four colors (Black light source 2BK, Magenta light source 2M, Yellow light source 2Y, and Cyan light source 2C); collimator lenses 13 corresponding to each of the four colors (black collimator lens 13BK, magenta collimator lens 13M, yellow collimator lens 13Y, and cyan collimator lens 13C); an aperture 14; a cylindrical lens 15; a polarizer 4; a scanning lens 5 common between the four colors; correcting lenses 6 corresponding to each of the four colors (black correcting lens 6BK, magenta correcting lens 6M, yellow correcting lens 6Y, and cyan correcting lens 6C). Scanning optical apparatus X2 also includes such as one or a plurality of deflecting mirrors corresponding to each of the four colors (black deflecting mirror 3BK1, magenta deflecting mirrors 3M1, 3M2, and 3M3, yellow deflecting mirrors 3Y1 and 3Y2, and cyan deflecting mirrors 3C1 and 3C2), however not shown in FIG. 7.

The beam light outputted from each of Light sources 2 is transformed into a parallel light (the light with no diameter changes relative to the traveling direction) by passing through Collimator lens 13. Also, the beam light is shaped by passing through Aperture 14. Furthermore, the beam light passes through Cylindrical lens 15, and by the light condensing effect thereof, converges near the surface of Polarizer 4, such as polygon mirrors or MEMS (MicroElectroMechanical system) mirrors. Polarizer 4 rotates about its rotating shaft center 4a, and thereby transforming the beam light into a scanning light.

FIG. 8 shows a cross-sectional view along a sub scanning direction of a scanning optical apparatus X1 according to an embodiment of the present invention, and more particularly, a cross-sectional view along a bisector S2-S2 of the scanning range of the beam light shown in FIG. 7.

As shown in FIG. 8, the beam light converged and reflected on or near Polarizer 4 falls on Scanning lens 5, and then is refracted by Scanning lens 5 such that, after the output, the light flux is reduced in the sub scanning direction along with the progression. Also, as being reduced, the beam light falls on each of Correcting lenses 6 corresponding to each of the colors. Correcting lens 6 is a spherical surface shape lens with its cross-sectional shape in the sub scanning direction having a fixed curvature. The beam light is converged on the surface of each Photoreceptor drum 1 by refraction of Correcting lens 6. With the beam light which converges in this way scanned on the surface of each Photoreceptor drum 1, an electrostatic latent image is written on each Photoreceptor drum 1.

In the above-mentioned structure, it is possible to suppress spherical aberration of Correcting lens 6 by gradually converging the beam light by means of Scanning lens 5 and Correcting lens 6, thereby realizing density growth of the beam light on each Photoreceptor drum 1. This enables improvement of the writing speed and the image quality of an electrostatic latent image.

However, the following problems are still concerned in the above-mentioned conventional example.

As has been well-known, sub scanning magnification β between Polarizer 4 and Photoreceptor drum 1 (the ratio between the size of the image on Polarizer 4 and the size of the image on Photoreceptor drum 1) depends on the ratio between a distance T from Polarizer 4 to the scanning position of the beam light on Photoreceptor drum 1 and a distance L3 from Polarizer 4 to the reduction starting point at which the beam light starts reducing. Particularly, in general, the smaller T is relative to L3, the larger the sub scanning magnification β increases. Additionally, in the case of FIG. 7, the distance L3 equals to the distance L2 from Polarizer 4 to Scanning lens 5.

When the sub scanning magnification P increases, the following problems occur. That is, as shown in FIG. 8, the incident position of the beam light on Polarizer 4 is displaced from the point A1 to the point B1 for the amount of ΔX. Accompanying with such displacement of the incident position of the beam light relative to Polarizer 4, displacement for the amount of ΔS may occur also in the incident position of the beam light relative to Photoreceptor drum 1. Such relationship between the displacement amounts of ΔX and ΔS can be represented in the following expression (1)

$$\Delta S = |\beta| \Delta X \quad (1)$$

In short, the sub scanning magnification β is a magnification ratio of the displacement of the beam light, and when such sub scanning magnification β is large, the displacement of the beam light in the sub scanning direction on Photoreceptor drum 1 becomes large. This makes it difficult to keep the scanning path of the beam light to be linear on Photoreceptor drum 1 (so-called field curvature becomes large), and cannot maintain the quality of an image formed in an image forming apparatus. In order to maintain the sub scanning magnification β small, the beam light reduction should be started as far from Polarizer 4 as possible (magnifying L3 relative to T) with Scanning lens 5 put away from Polarizer 4, however, the following problems may occur in such case.

In FIG. 9, the cross-section in the main scanning direction of Scanning optical apparatus X2 is illustrated in two ways: (a) when Scanning lens 5 is close to Polarizer 4, (b) when Scanning lens 5 is far from Polarizer 4.

As shown in FIG. 9(a), when Scanning lens 5 is close to Polarizer 4, Scanning lens 5 short in the main scanning direction can be used, since Scanning lens 5 deflects the beam light before the scanning range of the beam light scanned by Polarizer 4 is magnified in the main scanning direction. Similarly, Correcting lens 6 short in the main scanning direction can be used.

On the other hand, as shown in FIG. 9(b), when Scanning lens 5 is pulled away from Polarizer 4, Scanning lens 5 which is long enough for the scanning range of the beam light widely magnified in the main scanning direction is needed. Therefore, when Scanning lens 5 is pulled away from Polarizer 4 in order to maintain the sub scanning magnification β small, Scanning lens 5 is elongated in the main direction. Additionally, since Correcting lens 6 is generally longer than Scanning lens 5 in the main scanning direction, the elongation of Scanning lens 5 is synonymous with the elongation of Correcting lens 6, and consequently, resulting in size growth of the entire scanning optical apparatus.

As above, in the conventional example, it was impossible to strike a balance between maintaining the sub scanning magnification β small (decreasing field curvature) and downsizing the size of a scanning optical apparatus.

Consequently, this invention has been invented considering the foregoing conditions, and the purpose of this invention is to provide a scanning optical apparatus capable of maintaining the sub scanning magnification β small, and at the same time, keeping the size of the apparatus small without elongating a lens.

SUMMARY OF THE INVENTION

In order to achieve the above purpose, this invention provides a scanning optical apparatus comprising a first lens system for converging a beam light outputted from a prescribed light source which outputs a beam light, wherein said beam light is scanned on a prescribed scanning surface by a beam light scanning means such as polygon mirrors (hereinafter referred to as 'polarizer') arranged in or near a converging point of said beam light defined by said first lens system, and wherein said beam light to be scanned by a second lens system provided in between said polarizer and said scanning surface is converged on said scanning surface. Said second lens system includes a lens in the side of said polarizer corresponding to Scanning lens 5 in the description of a conventional example and a lens in the side of said scanning surface corresponding to Correcting lens 6 in the description of a conventional example, wherein said beam light is magnified by a lens in the side of said polarizer in a sub scanning direction which runs at right angle to a main scanning direction as a scanning direction of said beam light on said scanning surface, and said beam light is converged on said scanning surface as being reduced in said sub scanning direction by a lens (hereinafter referred to as 'aspherical surface lens') in the side of said scanning surface, wherein cross section along with incident surface and/or outputting surface of said beam light is formed as aspherical surface shape.

This structure shifts a reduction starting point in the sub scanning direction of the beam light from the side of the magnifying lens far from the scanning surface to the side of the decentered lens, and therefore, it is possible to maintain the sub scanning magnification β small even the magnifying lens and the decentered lens forming the second lens system are moved relatively closer to the side of the polarizer. By maintaining the sub scanning magnification β small, it becomes easy to suppress field curvature on the scanning surface of the beam light (that is, it becomes easy to keep the scanning line to be a beautiful linear), thereby writing a high-quality electrostatic latent image. Additionally, it is still possible to arrange the second lens system (the magnifying lens and the decentered lens) relatively in the side of the polarizer as maintaining the sub scanning magnification β small. Therefore, the magnifying lens and the decentered lens can be provided only to cover the scanning range of the beam light not yet spreading too wide, that is, these lenses short in the main scanning direction can be employed. This enables the downsizing of the apparatus.

In addition, when the beam light is magnified in the sub scanning direction, this makes it difficult to suppress the spherical aberration on the scanning surface. However, by employing an aspherical surface lens, it is possible to maintain spherical aberration small which is aggravated by magnification by the magnifying lens, and thereby enabling density growth of the beam light on the image supporting member.

As mentioned above, the point of this invention is that, sub scanning magnification β is suppressed small by magnifying the beam light in the sub scanning direction by means of the magnifying lens, as realizing shortening the length of each lens (downsizing of the apparatus with this) by arranging the second lens system near the scanning means, while realizing density growth of the beam light by suppressing spherical aberration aggravated by magnification of the beam light small by employing a decentered lens arranged as being decentered relative to the beam light as a lens in the downstream from the magnifying lens.

Here, the magnifying lens is preferred to have a negative refractive power which is capable of magnifying a parallel beam light with no diameter changes relative to its traveling direction. By using such magnifying lens having a negative refractive index, the sub scanning magnification β can be reduced to a still smaller value.

On the other hand, the beam light is converged on or near the polarizer, and moves in the magnifying lens from the polarizer as magnifying its diameter. Consequently, without such a positive refractive power strong enough to turn the beam light magnifying its diameter into reducing the same, the diameter of the beam light after passing through the magnifying lens is magnified, and therefore, the refractive power of the magnifying lens is not necessarily negative.

Furthermore, when L1 is a distance between the polarizer (the beam light scanning means) and the aspherical surface lens on the light axis of the beam light, and T is a distance between the polarizer and the scanning surface, and if the following expression (2) is satisfied, sufficient downsizing of the apparatus can be achieved, and moreover, the sub scanning magnification β can be maintained small.

$$0.2 \leq L1/T \leq 0.5 \quad (2)$$

Additionally, within the range in which the above conditions are satisfied, a condition: $|\beta| \leq 2$ necessary for writing a high-quality electrostatic latent image is satisfied. Also, spherical aberration can be suppressed small.

In addition, this invention is applicable to a multi-beam scanning optical apparatus using a plurality of light sources which respectively outputs the beam light.

According to the present invention, since a reduction starting point in the sub scanning direction of a beam light shifts from a magnifying lens side far from a scanning surface of the beam light to the scanning surface side, it is possible to maintain the sub scanning magnification β small, leaving the magnifying lens and the aspherical surface lens arranged near a polarizer. This allows the field curvature on the scanning surface of the beam light to be suppressed easily, thereby writing a high-quality electrostatic latent image. Additionally, arranging the magnifying lens and the aspherical surface lens near the polarizer, it is possible to realize downsizing of the apparatus without elongating these lenses in the main scanning direction.

In addition, when the beam light is magnified in the sub scanning direction, it becomes difficult to suppress the spherical aberration on the scanning surface. However, as mentioned above, by making cross section of lower side lens of the magnifying lens at a light path of the beam light as a lens with aspherical surface, it is possible to maintain spherical aberration small which is aggravated by magnification by the magnifying lens, and thereby enabling density growth of the beam light on the scanning surface.

These and other objects, features and advantages of the present invention will become more apparent upon reading of the following detailed description along with the accompanied drawings.

DETAILED DESCRIPTION OF THE PREFERRED EMBODIMENTS

With embodiments of the present invention described hereinafter with reference to the accompanying drawings, it is to be understood that the invention is not limited to those precise embodiments, and that various changes and modifications may be effected therein by one skilled in the art without departing from the scope or spirit of the invention as defined in the appended claims.

Figure 1:
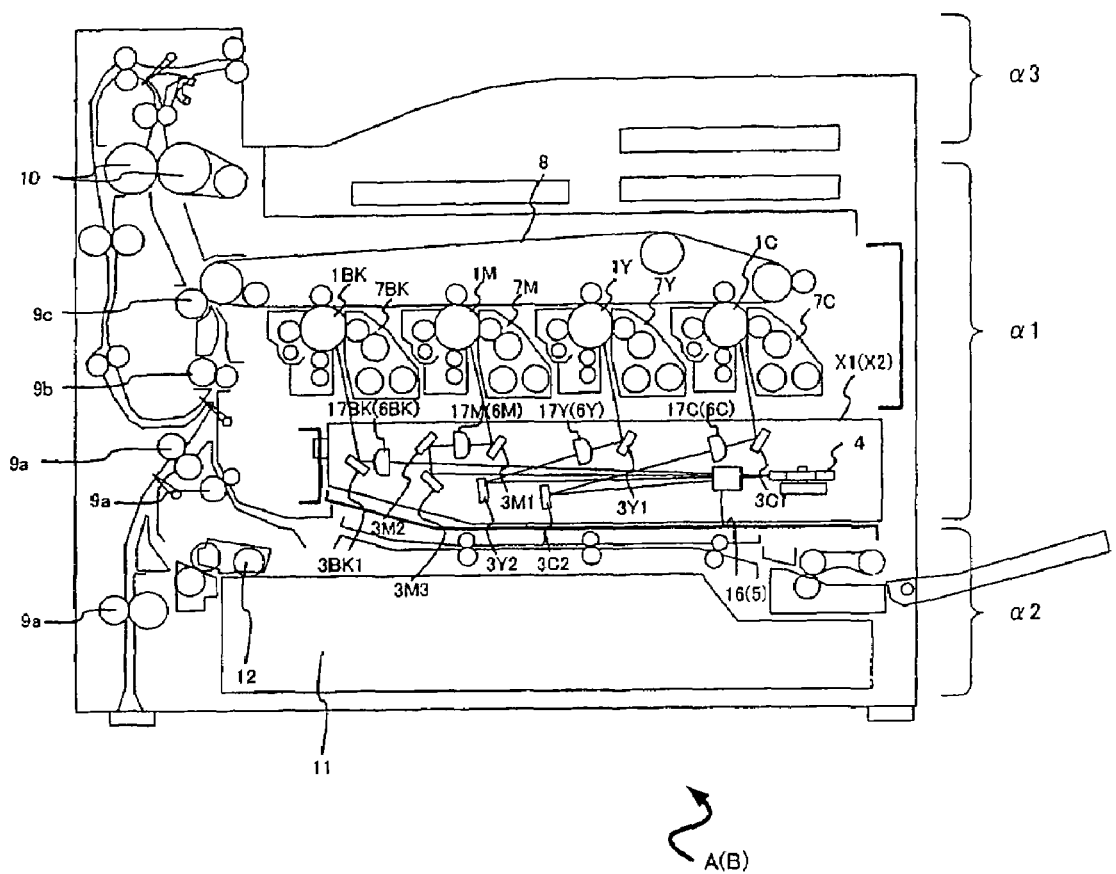
FIG. 1 shows a general structure of an image forming apparatus including a scanning optical apparatus according to an embodiment of the present invention.

A printer A shown in FIG. 1 is a tandem type printer having photoreceptor drums 1BK, 1M, 1Y and 1C corresponding to each of four colors: black (BK), magenta (M), yellow (Y), and cyan (C). Printer A includes a scanning optical apparatus X1 according to one embodiment of the present invention which writes an electrostatic latent image on each of Photoreceptor drums 1BK, 1M, 1Y, and 1C.

The feature of Printer A is it comprises a scanning optical apparatus X1 according to one embodiment of the present invention, and other parts are not described here since having no relationship with the present invention.

Hereinafter, as referring to FIG. 2, the feature of a scanning optical apparatus X1 according to one embodiment of the present invention is described in details.

Scanning optical apparatus X1 accommodates with tandem type Printer A, and that is, light paths are formed therein for guiding a beam light to each of four Photoreceptor drums 1. However, only one of four light paths is hypothetically indicated here in FIG. 2 for simplicity.

Scanning optical apparatus X1 comprises; Light sources 2 corresponding to each of the above-mentioned four colors (black light source 2BK, magenta light source 2M, yellow light source 2Y, and cyan light source 2C); collimator lenses 13 corresponding to each of the four colors (black collimator lens 13BK, magenta collimator lens 13M, yellow collimator lens 13Y, and cyan collimator lens 13C); an aperture 14; a cylindrical lens 15; a polarizer 4 (one example of a beam light scanning means); a scanning lens 16 common between the four colors (one example of a magnifying lens); correcting lenses 17 corresponding to each of the four colors (one example of a decentered lens: black correcting lens 17BK, magenta correcting lens 17M, yellow correcting lens 17Y, and cyan correcting lens 17C).

Figure 2:
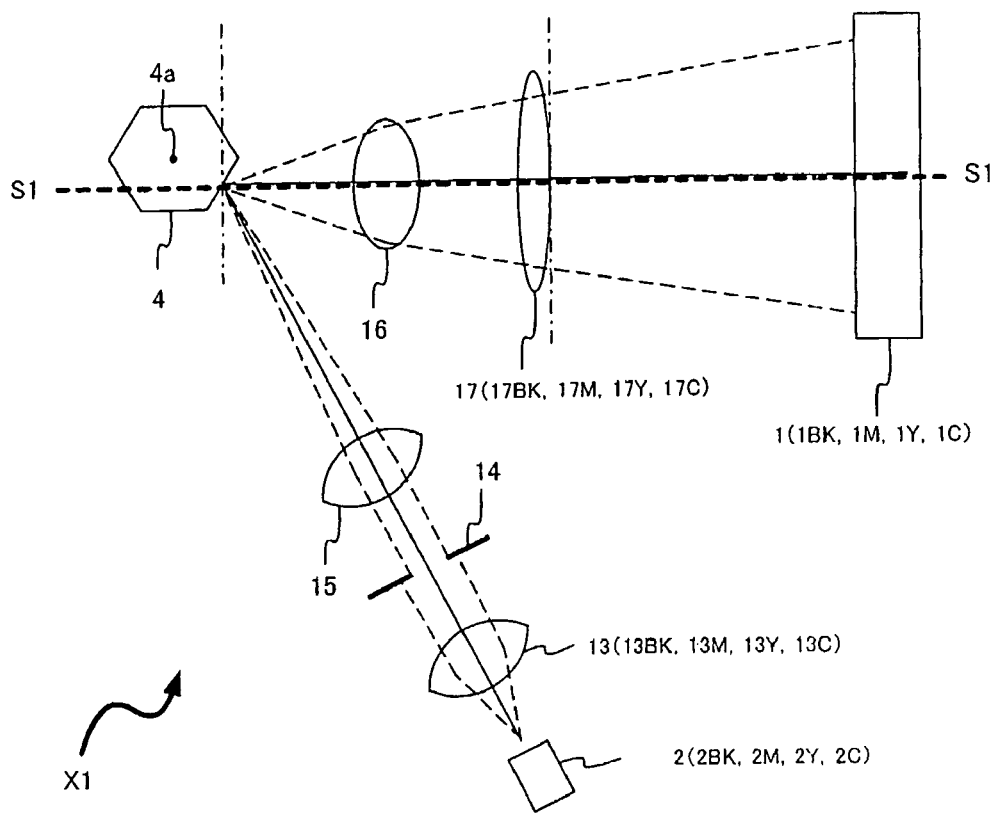
FIG. 2 shows a cross-sectional view including a scanning direction of a scanning optical apparatus according to an embodiment of the present invention.

Scanning optical apparatus X1 also includes such as one or a plurality of deflecting mirrors corresponding to each of the four colors (black deflecting mirror 3BK1, magenta deflecting mirrors 3M1, 3M2, and 3M3, yellow deflecting mirrors 3Y1 and 3Y2, and cyan deflecting mirrors 3C1 and 3C2), however not shown in FIG. 2.

The beam light outputted from each of Light sources 2 is transformed into a parallel light (the light with no diameter changes relative to the traveling direction) by passing through Collimator lens 13. Also, the beam light is shaped by passing through Aperture 14. Furthermore, the beam light passes through Cylindrical lens 15, and by the light condensing effect thereof, converges near the surface of Polarizer 4, such as a polygon mirror or a MEMS mirror. Polarizer 4 rotates about its rotating shaft center 4a, and thereby transforming the beam light into a scanning light for scanning the surface of each Photoreceptor drum 1 (one example of a scanning surface). Foregoing is similar to the conventional example. Collimator lens 13 and Cylindrical lens 15 are one example of a first optical system. And also, Polarizer 4 is one example of a beam light scanning means.

Here, in Scanning optical apparatus X1 according to one embodiment of the present invention, Scanning lens 5 and Correcting lens 6 in Scanning optical apparatus X2 according to the conventional example are replaced respectively with Scanning lens 16 and Correcting lens 17. With such structural difference, two requirements of downsizing of the apparatus and reducing the sub scanning magnification β (reducing field curvature) which are antinomy in the conventional example can be combined in Scanning optical apparatus X1 according to one embodiment of the present invention.

Figure 10:
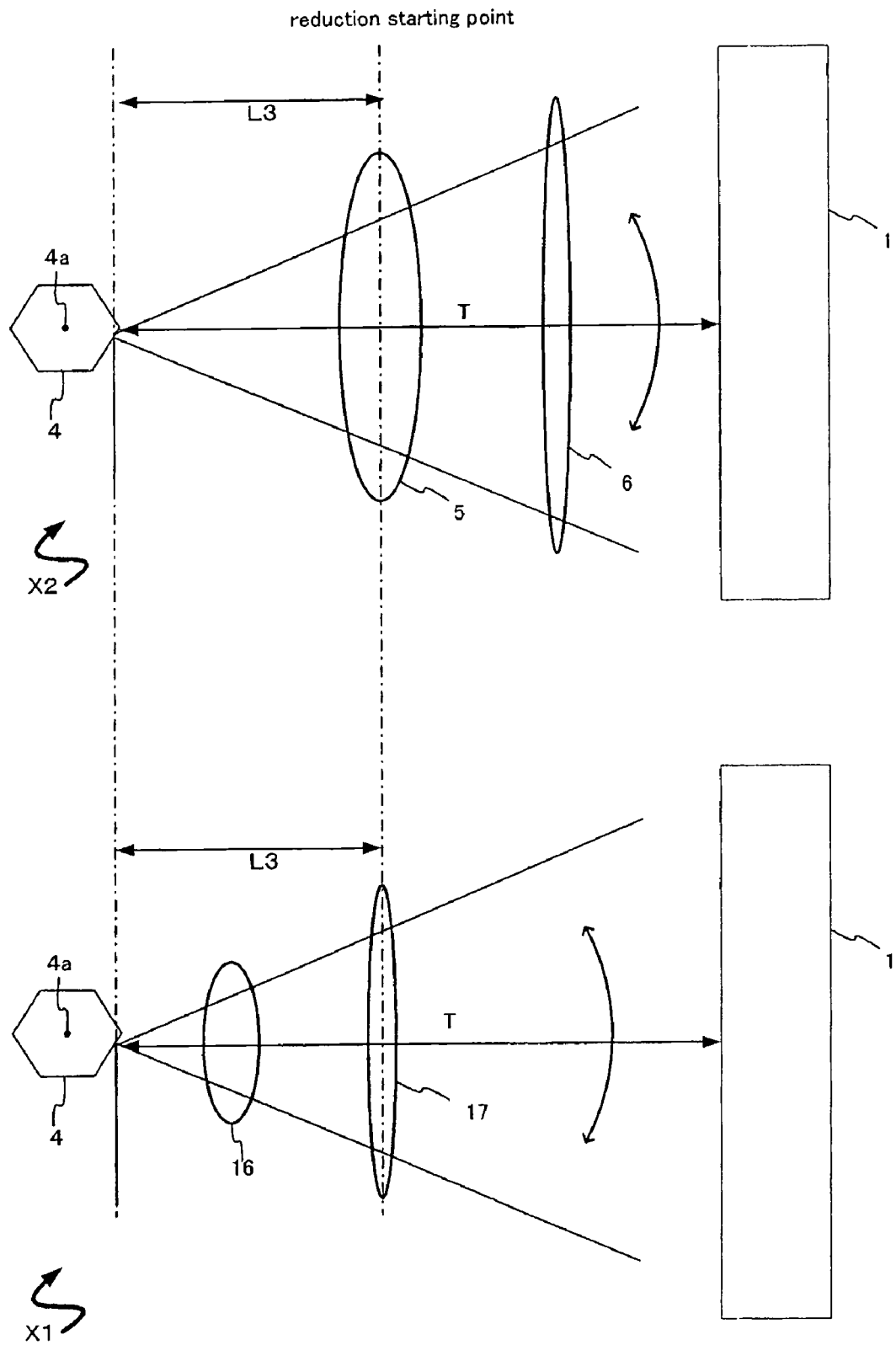
FIG. 10 shows a schematic diagram for describing the reason why the present invention achieves downsizing of the apparatus.

In FIG. 10, a schematic diagram for describing the reason why the present invention achieves downsizing of the apparatus is illustrated. Particularly, FIG. 10 shows a cross-section of the main scanning near Polarizer 4 in Scanning optical apparatus X2 according to the conventional example, as well as a cross-section of the main scanning near Polarizer 4 in Scanning optical apparatus X1 according to one embodiment of the present invention, in the same figure in the same scale. Hereinafter, as referring to FIG. 10, the reason why Scanning optical apparatus X1 according to one embodiment of the present invention achieves downsizing of the apparatus is described.

As mentioned above, the sub scanning magnification β between Polarizer 4 and Photoreceptor drum 1 depends on the ratio between a distance T from Polarizer 4 to Photoreceptor drum 1 and a distance L3 from Polarizer 4 to the reduction starting point where a light flux of the beam light starts to reduce in the sub scanning direction, and more particularly, the larger the ratio of L3 in T is, the smaller the sub scanning magnification β becomes.

In Scanning optical apparatus X2, the reduction starting point of light flux of the beam light is fixed to the position of Scanning lens 5 arranged in the side of Polarizer 4. On the other hand, in Scanning optical apparatus X1, from the reason described later, the reduction starting point of light flux of the beam light is fixed not to the position of Scanning lens 16, but to the position of Correcting lens 17 arranged in the side of Photoreceptor drum 1. Here, as shown in FIG. 10, even when Correcting lens 17 is arranged in the position of Scanning lens 5 in Scanning optical apparatus X2, the sub scanning magnification β same as that of Scanning optical apparatus X2 can be obtained in Scanning optical apparatus X1.

That is, since it is possible to arrange Scanning lens 16 and Correcting lens 17 near Polarizer 4, Scanning lens 16 and Correcting lens 17 can be provided only to cover the scanning range of the beam light which is not yet spreading too wide. And as shown in FIG. 10, it is therefore apparent that Scanning lens 16 and Correcting lens 17 used in Scanning optical apparatus X1 can be shorter in the main scanning direction than Scanning lens 5 and Correcting lens 6 used in Scanning optical apparatus X2 of the conventional example. Such reduction in lens length contributes to the downsizing of Scanning optical apparatus X1.

Figure 3:
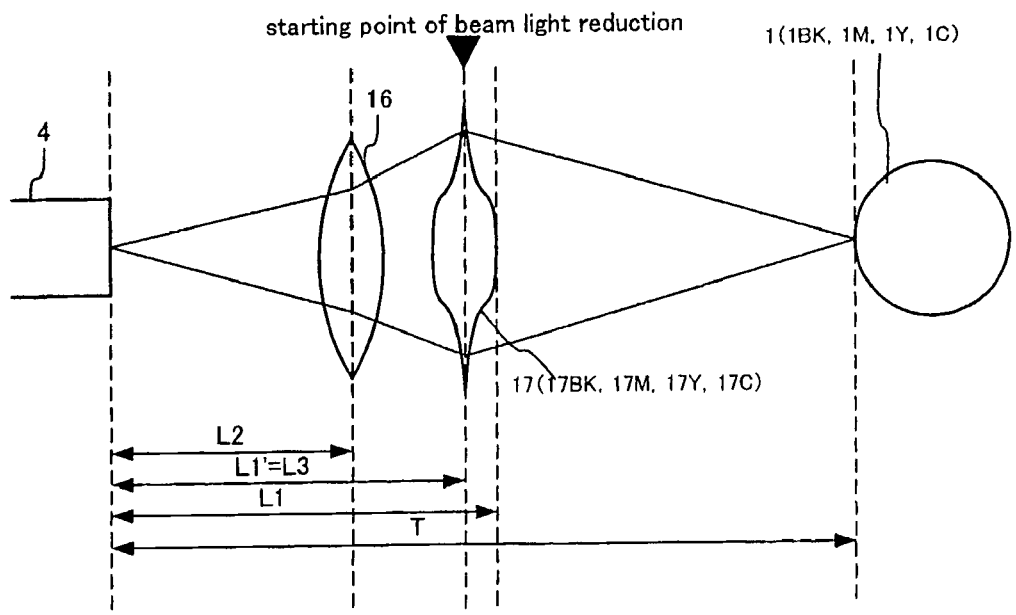
FIG. 3 shows a cross-sectional view along a sub scanning direction of a scanning optical apparatus according to an embodiment of the present invention.

FIG. 3 shows a cross-sectional view along a sub scanning direction of Scanning optical apparatus X1 according to an embodiment of the present invention, and more particularly, shows a cross-sectional view along a bisector S1-S1 of the scanning range of the beam light shown in FIG. 2. Hereinafter, as referring to FIG. 3, the feature point of Scanning optical apparatus X1 according to one embodiment of the present invention is explained. Additionally, although the following explanation uses a cross-sectional view along the bisector S1-S1, it is needless to say that the following explanation can be approved at least in an arbitrary position within the scanning range of the beam light in the main scanning position.

As shown in FIG. 3, a light flux of the beam light scanned in the main scanning direction by Polarizer 4 is converged in the sub scanning direction on the surface (scanning surface) of Photoreceptor drum 1 by means of Scanning lens 16 in Polarizer 4 side and Correcting lens 17 in Photoreceptor drum 1 side. Scanning lens 16 and Correcting lens 17 are one example of the second lens system.

Here, on the surface of Polarizer 4, the light flux of the beam light is once converged by Cylindrical lens 15 (see FIG. 2), and the beam light from Polarizer 4 then falls on Scanning lens 16 as magnifying its diameter along with the progression.

In the conventional example, Scanning lens 5 has a strong positive refractive power, and thus, the beam light falling on Scanning lens 5 as magnifying its diameter becomes a light which proceeds while reduces by refraction of Scanning lens 5 when outputted from Scanning lens 5. On the other hand, Scanning lens 16 in Scanning optical apparatus X1 according to an embodiment of the present invention has a negative refractive power, and as shown in FIG. 3, further magnifies the beam light falling on as magnifying its diameter in the sub scanning direction. Scanning lens 16 is one example of a magnifying lens.

In the conventional example, the reduction starting point of the light flux of the beam light is fixed to the position of Scanning lens 5 arranged in the side of Polarizer 4. On the other hand, as in Scanning optical apparatus X1 according to an embodiment of the present invention, the reduction starting point of the light flux of the beam light is determined according to the position of Correcting lens 17, not Scanning lens 16, by magnifying the light flux of the beam light in the sub scanning direction by means of Scanning lens 16. Thus, the distance L3 between Polarizer 4 and the reduction starting point becomes equal to a distance L1' from Polarizer 4 to Correcting lens 17, not to the distance L2 between Polarizer 4 and Scanning lens 16 as in the conventional example. Consequently, the ratio of the distance L3 from Polarizer 4 to the reduction starting point in the distance T from Polarizer 4 to Photoreceptor drum 1 becomes greater, and as a response to this, the sub scanning magnification β becomes smaller.

As shown in FIG. 3, spherical aberration on the surface of Photoreceptor drums 1BK, 1M, 1Y, and 1C is generally aggravated by magnifying the beam light without reducing it by Scanning lens 16.

Here, in Scanning optical apparatus X1, as shown in FIG. 3, enabling to suppress aggravated spherical aberration, Correcting lens 17, which is rotation symmetry aspherical surface lens, is employed instead of Correcting lens 6, which is spherical lens in the conventional example wherein cross section in the sub scanning direction (cross section in the direction of FIG. 3) is indicated by Expression (3) below.

$$x = \frac{y^2/r_m}{1+\sqrt{1-(1+K)y^2/r_m^2}} + A_4 y^4 + A_6 y^6 + A_8 y^8 + A_{10} y^{10} \quad (3)$$

x is sag amount in the direction of light axis (left and right direction in FIG. 3); y is height of the sub scanning direction (up and down direction in FIG. 3) (starting point is the lens axis position of the Correcting lens 17); $r_m$ is curvature relative to the main scanning direction wherein the cross section along with the bisectrix S1-S1 of the scanning area of the beam light indicated in FIG. 2; K is conic constant; and A4, A5, A6, A7, A8, A9 and A10 are factors of the Correcting lens 17 that should be configured properly in manufacturing.

By employing Correcting lens 17 with such shape, it is possible to maintain spherical aberration of the beam light small which is aggravated by magnification by the Scanning lens 16. In addition, since such mode of expression for aspherical surface lens by above Expression (3) is common, detailed description is omitted.

Among surfaces of Correcting lens 17, it is accepted to adopt a shape prescribed by above Expression (3) in either of incident side surface of the beam light (Surface 3 after-mentioned) or outputting side surface of the beam light (Surface 4 after-mentioned) or both of them.

Figure 4:
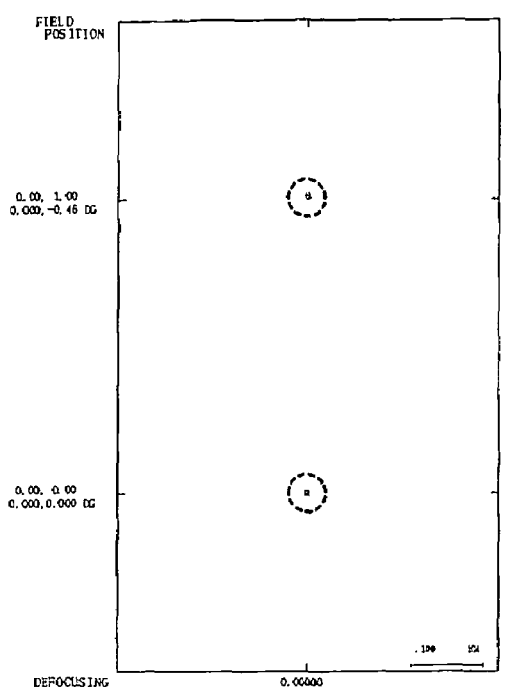
FIG. 4 shows a graph for describing converging effect of a beam light from a scanning optical apparatus according to an embodiment of the present invention.
Figure 4:
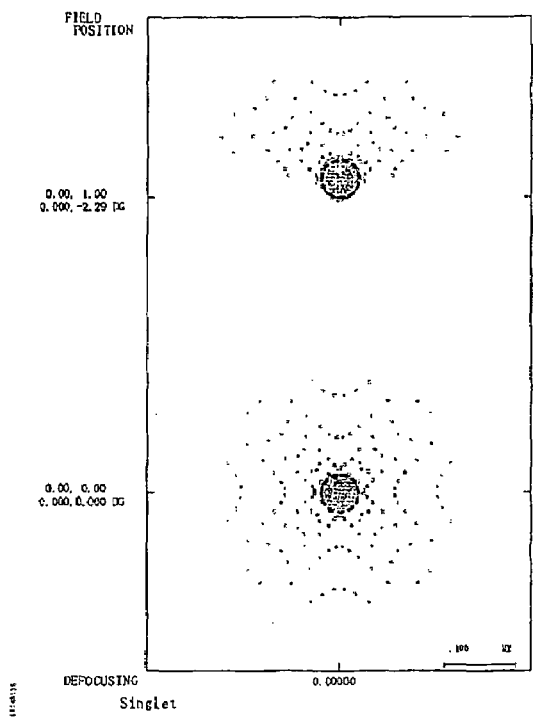
Figure 4:
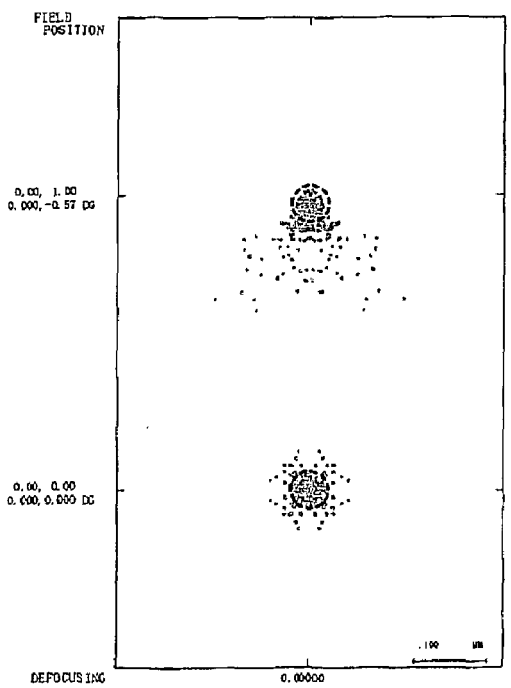
Figure 4:
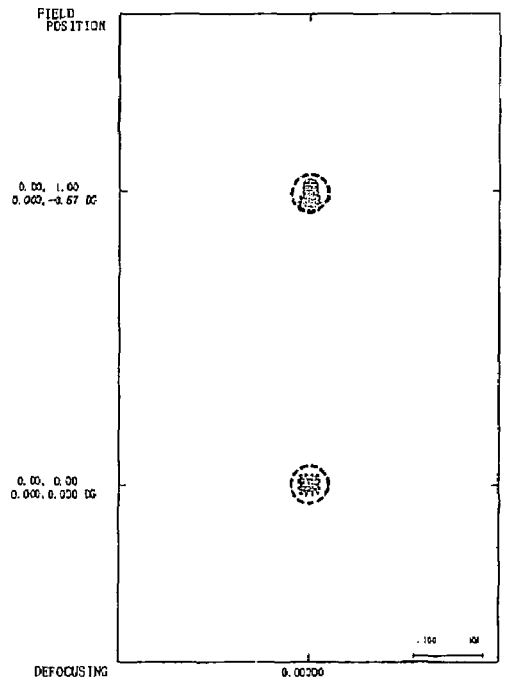

The following chart 1 indicates various constant numbers which determine the optical characteristic of Scanning optical apparatus X1. Additionally, a chart 2 indicates various constant numbers which determine the specific shape of Correcting lens 17. Furthermore, FIG. 4 shows a plan view indicating achieving point of the beam light relating to the Photoreceptor drum 1 when using Scanning optical apparatus X1 in the case optical characteristic being determined under various condition. In addition, FIG. 4(a) shows a plan view when using Correcting lens 17 with aspherical surface of which shape is set by above mentioned Chart 2, and FIG. 4(b) shows a plan view when using Correcting lens 6 which is spherical surface shape and employed in the conventional example.

Surface numbers 1, 2, 3 and 4 indicated in Chart 1 in below respectively correspond to: a surface of the incident side of the beam light from Scanning lens 16 (hereinafter referred to as "surface 1"), and a surface of outputting side of the same (hereinafter referred to as "surface 2"), and a surface of the incident side of the beam light from Correcting lens 17 (hereinafter referred to as "surface 3"), and a surface of outputting side of the same (hereinafter referred to as "surface 4"). Also, surface separation numbers 1, 2, 3, 4 and 5 respectively correspond to separations: between the reflecting surface of the beam light of Polarizer 4 and Surface 1, between Surface 1 and Surface 2, between Surface 2 and Surface 3, between Surface 3 and Surface 4, and between Surface 4 and the scanning surface of Photoreceptor drums 1BK, 1M, 1Y, and 1C.

In addition, dashed circles illustrated in FIGS. 4(a), (b), (c), and (d) indicate the boundary of reaching point of the beam light for obtaining sufficient density of the beam light on Photoreceptor drum 1. That is, the converging condition of the beam light within the dashed circles indicates a condition in which generally desirable density of the beam light is being obtained.

CHART 1

| Lens | refraction index | surface # | curvature radius |
|---|---|---|---|
| Scanning lens 16 | 1.507595 | 1 | 40.775 |
|  |  | 2 | 10.950 |
| Correcting lens 17 | 1.507595 | 3 | 115.688 |
|  |  | 4 | −24.880 |

| surface separation # | surface separation |
|---|---|
| 1 | 25 |
| 2 | 5 |
| 3 | 45 |
| 4 | 5 |
| 5 | 120 |

CHART 2

| Surface # | A4 | A6 | A8 | A10 | K |
|---|---|---|---|---|---|
| 3 | 0.00E+00 | 0.00E+00 | 0.00E+00 | 0.00E+00 | 0.00E+00 |
| 4 | 8.47E−06 | 7.00E−09 | −6.94E−12 | 2.43E−13 | 0.00E+00 |

When using Correcting lens 17 arranged in accordance with various constant numbers prescribed in Chart 2, as illustrated in FIG. 4(a), the beam light is sufficiently narrowed down on Photoreceptor drum 1, and it can be seen that spherical aberration is suppressed. Thus, it is possible to increase writing speed of an electrostatic latent image and to increase image quality since the beam light of high density is illuminated on Photoreceptor drum 1.

On the other hand, as shown in FIG. 4(b), when using Correcting lens 6 which is spherical surface shape and employed in the conventional example, instead of aspherical surface lens, Correcting lens 17, it is hard to say that the beam light is sufficiently narrowed down in Photoreceptor drum 1, and that means spherical aberration is not sufficiently suppressed. Therefore, it causes degradation of image quality at the end side of Photoreceptor drum 1 compared with at the center area thereof.

In addition, when Scanning optical apparatus X1 is composed according to Charts 1 and 2, the sub scanning magnification β is −1. Also, according to Chart 1, the parameter L1/T described later is 0.4.

Here, as shown in FIG. 3, when L1 is a distance between Polarizer 4 and the outputting side of the beam light of Correcting lens 17 on the light axis of the beam light, and T is a distance between Polarizer 4 and the surface (scanning surface) of Photoreceptor drum 1, and if the following expression (3) is satisfied, downsizing of the apparatus as well as maintaining image quality by reducing sub scanning magnification β can be sufficiently achieved.

$$0.2 \leq L1/T \leq 0.5 \qquad (3)$$

0.5 as a higher limit of L1/T indicates a boundary for sufficiently downsizing Scanning optical apparatus X1.

0.2 as a smaller limit of L1/T indicates a limit for maintaining image quality high. Also, when L1/T is smaller than 0.2, spherical aberration cannot be suppressed even though Correcting lens 17 arranged as being decentered is used, since the beam light after passing through Scanning lens 16 spreads too wide in the sub scanning direction. Alternatively, the shape of Correcting lens 17 needs to be a lens shape hard to be produced.

Chart 3 in below indicates various constant numbers which determine the optical characteristics of Scanning optical apparatus X1 of when L1/T=0.15 is satisfied. And also, Chart 4 in below indicates various constant numbers which determine the specific shape of Correcting lens 17 of when L1/T =0.15 is satisfied.

Similarly, the following Chart 5 indicates various constant numbers which determine the optical characteristics of Scanning optical apparatus X1 of when L1/T is at its smaller limit of 0.2. And also, Chart 6 in below indicates various constant numbers which determine the specific shape of Correcting lens 17 of when L1/T=0.2 is satisfied.

CHART 3

| Lens | refraction index | surface # | curvature radius |
|---|---|---|---|
| Scanning lens 16 | 1.507595 | 1 | −8.5930913 |
|  |  | 2 | 2.93775193 |
| Correcting lens 17 | 1.507595 | 3 | 5.78049204 |
|  |  | 4 | −7.8476869 |

| surface separation # | surface separation |
|---|---|
| 1 | 10 |
| 2 | 5 |
| 3 | 10 |
| 4 | 5 |
| 5 | 170 |

CHART 4

| Surface # | A4 | A6 | A8 | A10 | K |
|---|---|---|---|---|---|
| 3 | −1.34E−03 | −2.56E−06 | 4.10E−07 | −3.67E−09 | −2.05E+06 |
| 4 | −4.31E−04 | 1.83E−08 | 1.70E−09 | −9.81E−10 | 1.22E−01 |

CHART 5

| Lens | refraction index | surface # | curvature radius |
|---|---|---|---|
| Scanning lens 16 | 1.507595 | 1 | −1.390 |
|  |  | 2 | −5.053 |
| Correcting lens 17 | 1.507595 | 3 | 4.930 |
|  |  | 4 | −14.786 |

| surface separation # | surface separation |
|---|---|
| 1 | 10 |
| 2 | 5 |
| 3 | 20 |
| 4 | 5 |
| 5 | 160 |

CHART 6

| Surface # | A4 | A6 | A8 | A10 | K |
|---|---|---|---|---|---|
| 3 | −4.85E−04 | 1.23E−06 | 5.53E−08 | −3.09E−10 | −1.45E+07 |
| 4 | −4.10E−04 | 2.07E−06 | −1.94E−08 | 2.18E−10 | −2.45E+00 |

FIG. 4(c) is a plain view indicating reaching point of the beam light to Photoreceptor drum 1 of when the optical characteristic of Scanning optical apparatus X1 is prescribed according to each of the parameters in Chart 3 and Chart 4. In addition, FIG. 4(d) is a plain view indicating reaching point of the beam light to Photoreceptor drum 1 of when optical characteristics of Scanning optical apparatus X1 is prescribed according to each of the parameters in Charts 5 and 6 in the above.

As shown in FIG. 4(c), it can be seen that, when L1/T is smaller than 0.2, the beam light is not narrowed down on Photoreceptor drum 1 even though Correcting lens 17 which is aspherical surface lens is used. In addition, as shown in FIG. 4(d), when L1/T=0.2, it is a critical situation right before the narrowing range of the beam light scatters out from the area of the dashed circle mentioned above, and that is the limiting point for satisfying the image quality.

Additionally, when Scanning optical apparatus X1 is composed according to Charts 3 and 4, as well as according to Charts 5, and 6, the sub scanning magnification β is −2.

As mentioned above, for the purposes of downsizing the apparatus, decreasing the sub scanning magnification β, and reducing spherical aberration, it is desirable to maintain L1/T within the range of 0.2 to 0.5.

Scanning optical apparatus X1 according to one embodiment of the present invention shows that the reduction starting point of the beam light, which was in the position of Scanning lens 5 (corresponding to Scanning lens 16) in the conventional example, shifts to the side of Correcting lens 6 (corresponding to Correcting lens 17) by predetermining the refractive power of Scanning lens 16 such that the light flux of the beam light is magnified by Scanning lens 16. Therefore, it is possible to suppress sub scanning magnification β defined by Scanning lens 16 and Correcting lens 17 small.

In addition, even when sub scanning magnification β same as that of the conventional example is obtained, it is still possible to put both Scanning lens 16 and Correcting lens 17 relatively in the side of Polarizer 4. This, as shown in FIG. 2, makes it possible for the beam light scanned in the main scanning direction by Polarizer 4 fall on Scanning lens 16 and Correcting lens 17 before its scanning range in the main scanning direction spreads too wide, thereby preventing Scanning lens 16 and Correcting lens 17 from being elongated in the main scanning direction.

In addition, when the ray of the beam light is magnified in the sub scanning direction, it becomes difficult to suppress spherical aberration on the scanning surface. However, as mentioned above, it is possible to suppress the spherical aberration aggravated by such magnification small by arranging Correcting lens 17 decentered relative to Light axis a2 of the beam light, and thus, density growth of the beam light on Photoreceptor drum 1 can be achieved.

Embodiment

Figure 5:
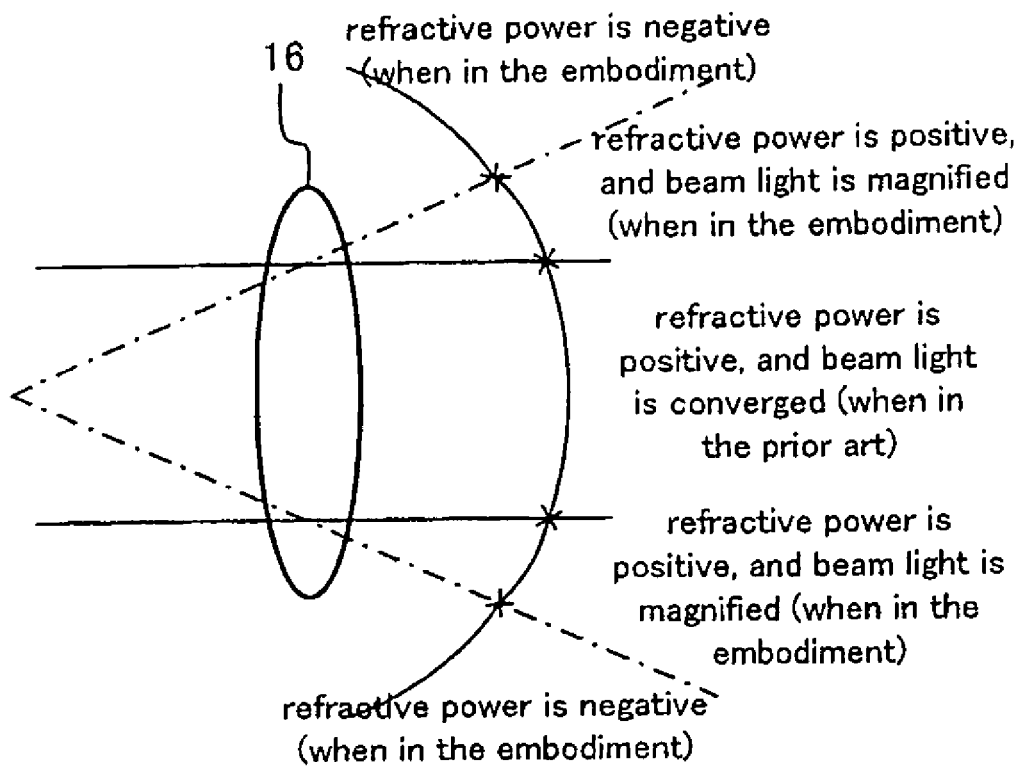
FIG. 5 shows a schematic diagram for describing a relationship between refractive power of a scanning lens and diameter change of beam light.

In the above embodiment, an example in which a beam light is magnified in a sub scanning direction by previously determining the refractive power of Scanning lens 16 at negative value is described, however, it is not intended to limit the scope of this invention. That is, as shown in FIG. 5, it is possible to shift the reduction starting point of the beam light from Scanning lens 16 to the side of Correcting lens 17, even thought the refractive power of Scanning lens 16 is predetermined at positive but small value with which the beam light will not converge in a sub scanning direction. Even in such case, it is still possible to decrease the sub scanning magnification β.

Figure 6:
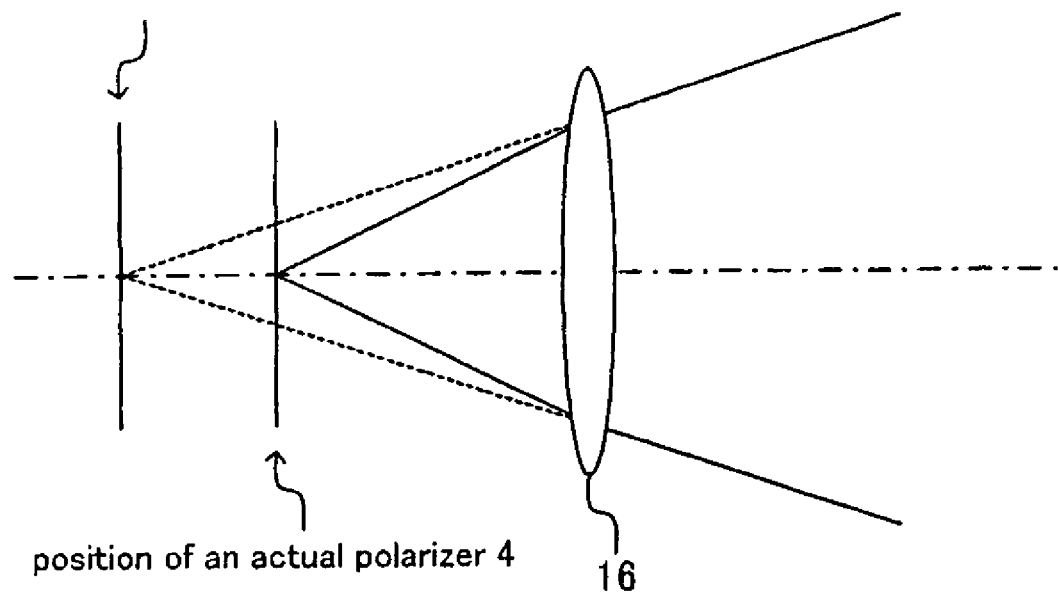
FIG. 6 shows a schematic diagram for describing displacement of a hypothetical polarizer.
Figure 7:
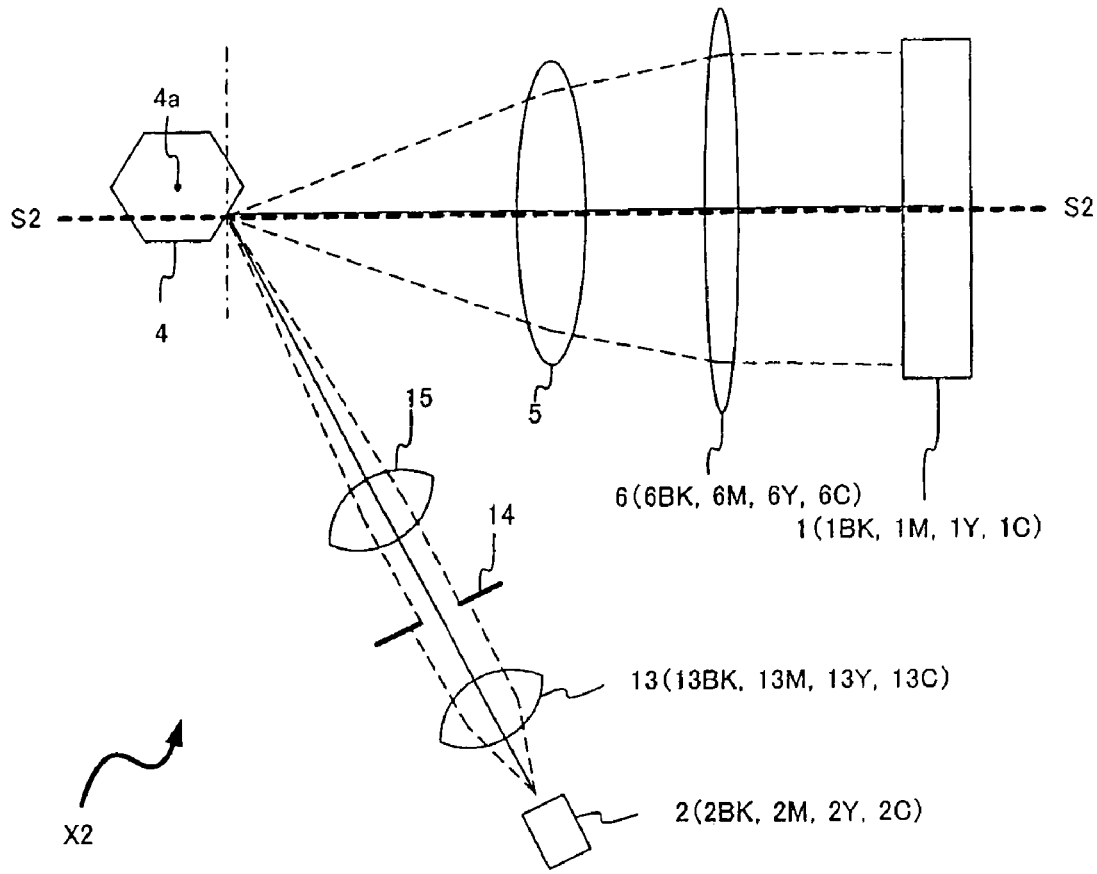
FIG. 7 shows a cross-sectional view along a main scanning direction of a scanning optical apparatus according to a conventional example.
Figure 8:
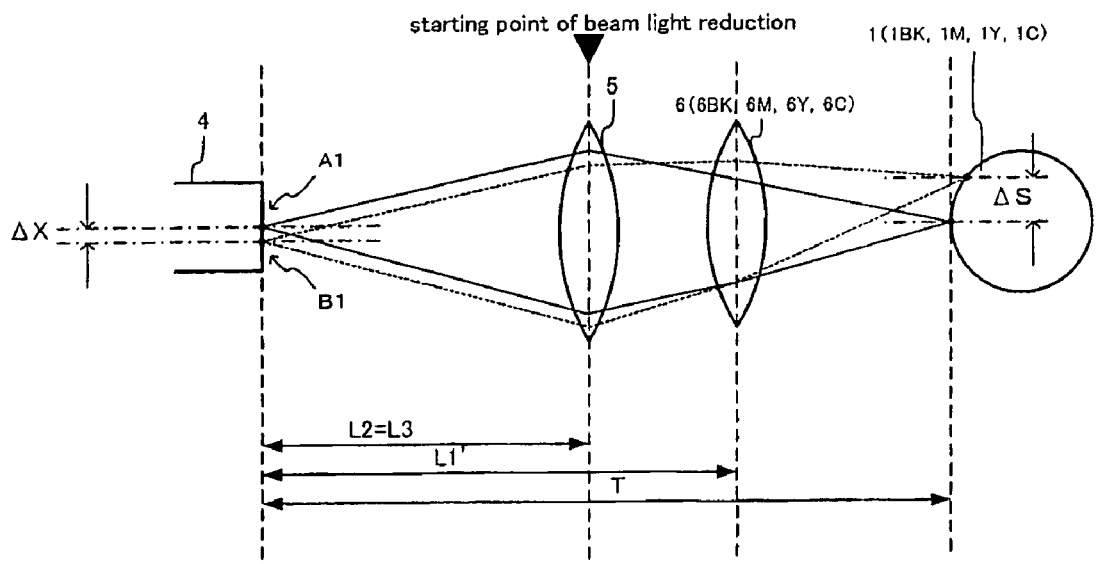
FIG. 8 shows a cross-sectional view along a sub scanning direction of a scanning optical apparatus according to a conventional example.
Figure 9:
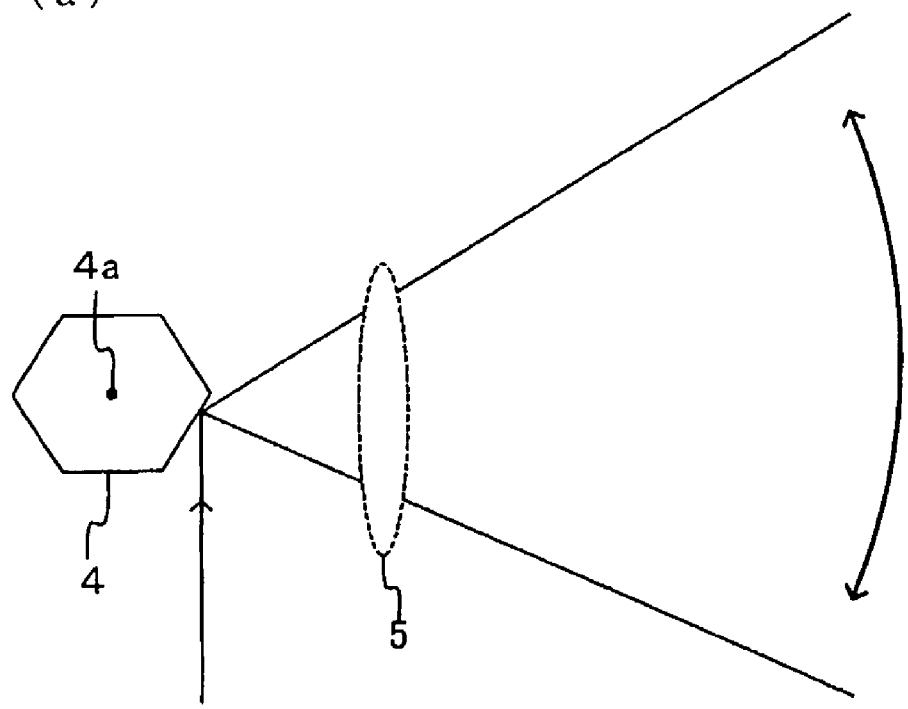
FIG. 9 shows a schematic diagram for describing length change of a lens relative to the distance from a polarizer.
Figure 9:
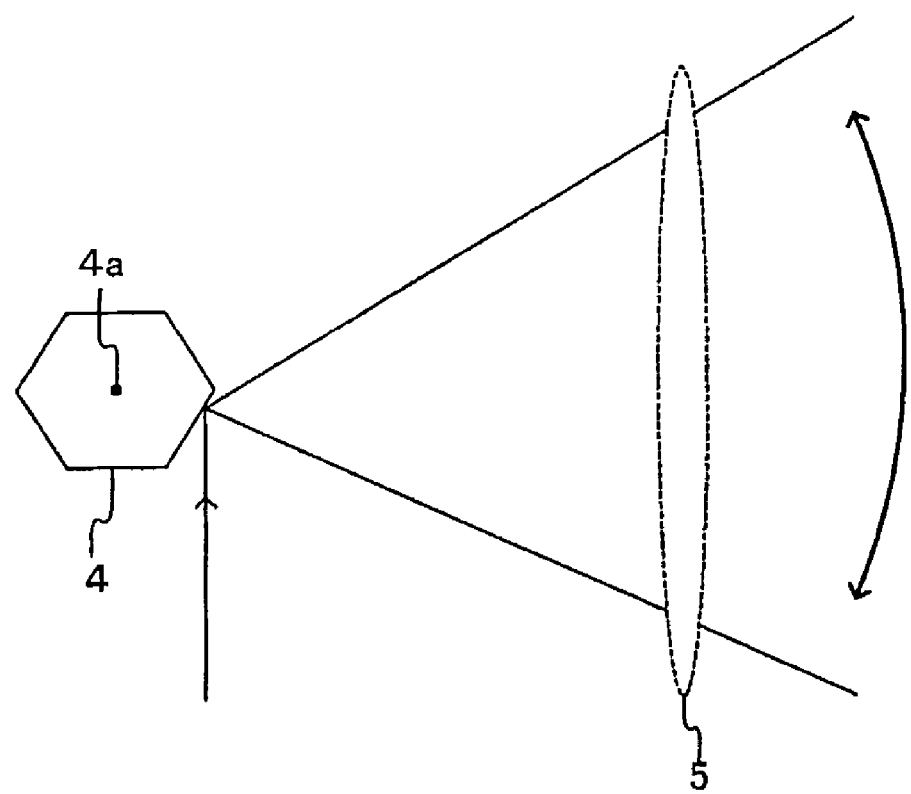

In addition, the following occurs when refractive power of Scanning lens 16 is predetermined at a small but positive value with which the light flux of the beam light does not converge in the sub scanning direction. That is, as shown in FIG. 6, by refracting the beam light by Scanning lens 16, the position of Polarizer 4 as an outputting position of the beam light relative to Scanning lens 16 shifts from an actual position to a hypothetical position farer from Scanning lens 16 than the actual position. This allows the optical characteristics same as that of when the distance between Polarizer 4 and Scanning lens 16 (and Correcting lens 17) is fixed long to be obtained, and more particularly, the sub scanning magnification β can be decreased.

In the above embodiment, aspherical surface lens, which is rotation symmetry, is used as an example of aspherical lens, however, it is not intended to limit the scope of this invention. That is, it is possible to use aspherical lens of spherodial surface or hyperbolic surface, or aspherical lens which is provided by high-order curve (referred to Patent Literature 2, unexamined Japanese Publication No. 2004-309559).

In the above embodiment, the example in which Scanning optical apparatus X1 according to one embodiment of the present invention is applied to a printer is described, however, the present invention can be applicable to various image forming apparatuses, such as copiers, facsimiles, and MFPs (Multi Function Products).

And also, in the above embodiment, Scanning lens 16 and Correcting lens 17 are respectively consisted of a single lens, however, it is not intended to limit the scope of this invention. That is, each of Scanning lens 16 and Correcting lens 17 may be consisted of a plurality of lenses, and the function of Scanning lens 16 and Correcting lens 17 mentioned above may be realized by such plurality of lenses.

What is claimed is:

1. A scanning optical apparatus comprising:
    a first lens system for converging a beam light outputted from a prescribed light source which outputs a beam light;
    a bean light scanner for scanning said beam light on a prescribed scanning surface as reflecting said beam light on or near a converging point of said beam light defined by said first lens system; and
    a second lens system for converging said beam light scanned by said beam light scanner in a sub scanning direction intersecting at least with a traveling direction of said beam light and a main scanning direction of said beam light on said scanning surface,
    wherein said second lens system comprises a magnifying lens for magnifying said beam light in said sub scanning direction, being arranged in the side of said beam light scanner, and an aspherical surface lens for converging said beam light in said sub scanning direction on said scanning surface, arranged in the side of said scanning surface, wherein a cross section of a beam light incidence surface and/or an outputting surface along the sub scanning direction is formed as an aspherical surface shape.

2. A scanning optical apparatus according to claim 1, wherein said magnifying lens has a negative refractive power in said sub scanning direction.

3. A scanning optical apparatus according to claim 1, wherein an expression: $0.2 \leq L1/T \leq 0.5$ is satisfied, in which L1 is a distance from said beam light scanner to said aspherical surface lens on a light axis of said beam light, and T is a distance between said beam light scanner and said scanning surface.

4. A scanning optical apparatus according to claim 2, wherein an expression: $0.2 \leq L1/T \leq 0.5$ is satistied, in which L1 is a distance from said beam light scanner to said aspherical surface lens on a light axis of said beam light, and T is a distance between said beam light scanner and said scanning surface.

5. A scanning optical apparatus according to claim 1, further comprising a plurality of light sources which respectively output said beam light.

6. A scanning optical apparatus according to claim 2, further comprising a plurality of light sources which respectively output said beam light.

7. A scanning optical apparatus according to claim 3, further comprising a plurality of light sources which respectively output said beam light.

8. A scanning optical apparatus according to claim 4, further comprising a plurality of light sources which respectively output said beam light.

* * * * *